May 15, 1951  B. W. KING, JR., ET AL  2,552,795
CERAMIC PIGMENTS

Filed Jan. 17, 1949  2 Sheets-Sheet 1

Parts $CeO_2$ by weight

| Parts $Al_2O_3$ by weight | 0 | .45 | .90 | 1.35 | 1.80 | 3.60 | 5.40 | 7.20 | 9.00 | 13.50 |
|---|---|---|---|---|---|---|---|---|---|---|
| 14 |  | AB Faint | AC Fair |  | AE Str. | AF Str. | AG Str. | AH Str. | AI Str. | AK Med. |
| 12 |  |  |  |  |  | BF Str. |  | BH Str. |  |  |
| 10 | CA Near White | CB Faint | CC Med. | CD Med. | CE Str. | CF Best | CG Str. | CH Str. | CI Str. |  |
| 8 |  |  |  |  |  | DF Str. |  | DH Str. |  |  |
| 6 |  |  | EC Med. |  | EE Str. | EF Str. | EG Str. | EH Str. | EI Med. |  |
| 3 |  |  |  |  |  | FF Str. |  |  |  |  |
| 1.5 |  | GB Faint | GC Med. |  |  | GF Med. |  |  |  | GK Med. |
| 0 | HA Near White |  | HC Pale |  |  | HF Fair |  |  |  | HK Fair |

PbO 61.60 and $Sb_2O_5$ 29.70 pts. by wt. all samples

Fig-1

| PbO pts. by wt. | 71.5 | 66.6 | 61.6 | 56.9 | 52.3 | 47.3 | 42.2 |
|---|---|---|---|---|---|---|---|
|  | CFA Good | CFB Rich | CF Best | CFD Rich | CFE Med. | CFF Med. | CFG Pale |
| $Sb_2O_5$ pts. by wt. | 8.6 | 24.2 | 29.7 | 35.3 | 40.8 | 46.5 | 52.0 |

Fig-2

| $Fe_2O_3$ pts. by wt. | 0 | 1 | 2 | 4 | 6 | 10 |
|---|---|---|---|---|---|---|
|  | CF → | CFH → | CFI → | CFK Best | CFL ← | CFM ← |

Composition otherwise same as CF

Fig-3

INVENTORS
BY Burnham W. King Jr.
Adolph O. Tesar
William H Brown Atty.

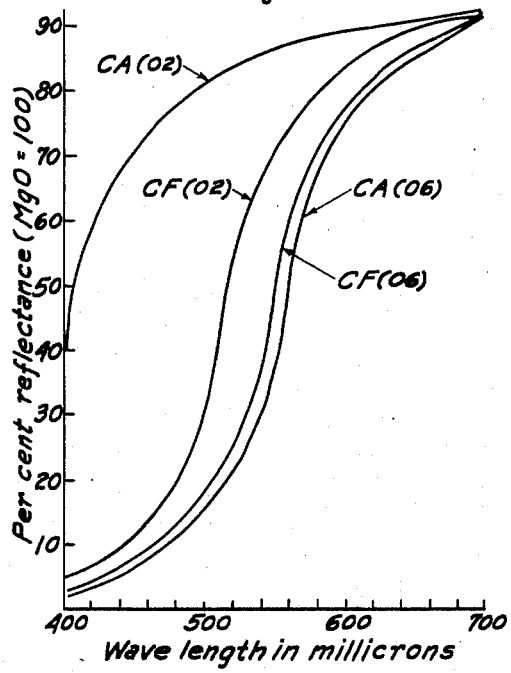
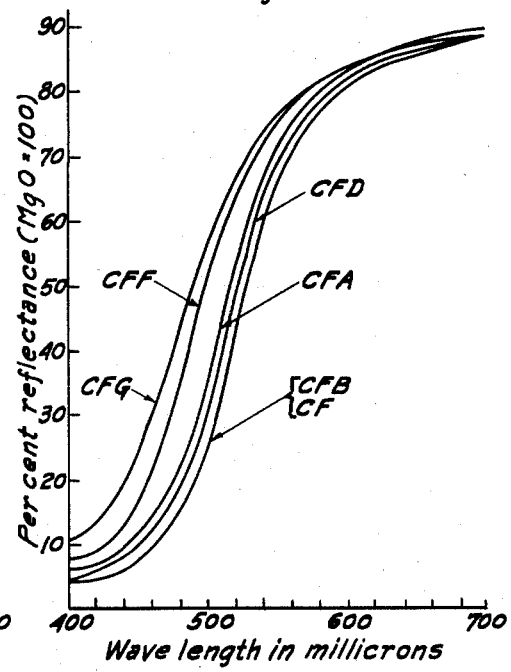
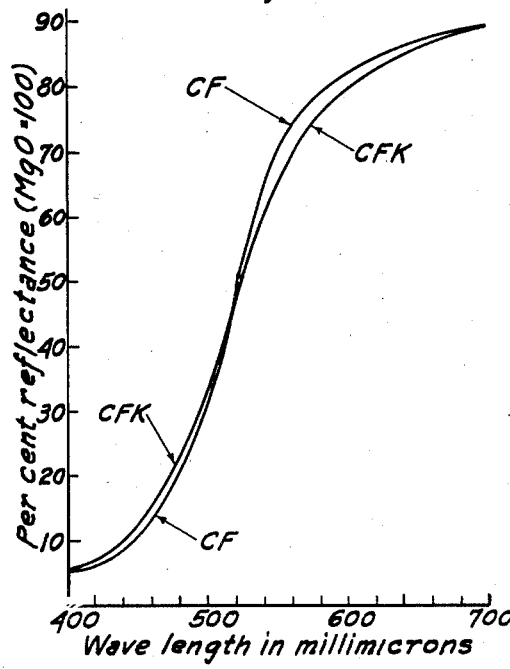
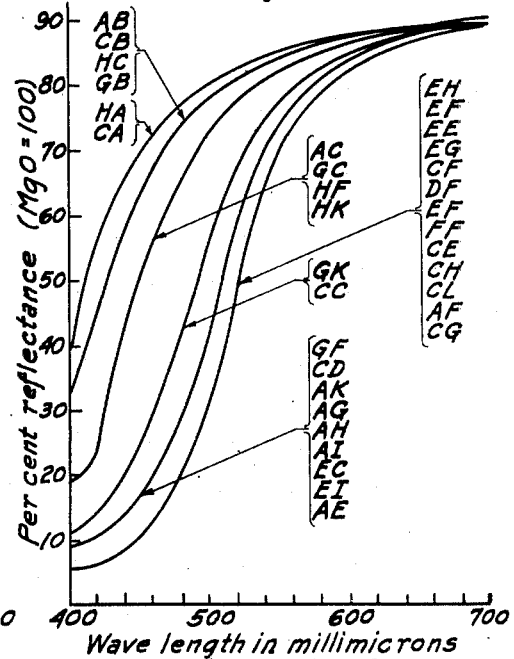

Patented May 15, 1951

2,552,795

UNITED STATES PATENT OFFICE 2,552,795

CERAMIC PIGMENTS

Burnham W. King, Jr., Shaker Heights, and Adolph O. Tesar, Cleveland, Ohio, assignors to The Harshaw Chemical Company, Cleveland, Ohio, a corporation of Ohio Application January 17, 1949, Serial No. 71,342

11 Claims. (Cl. 106—297)

This invention relates to ceramic pigments and specifically to improved lead antimonate compositions capable of retaining a yellow color at unusually high firing temperatures.

Lead antimonate pigments of the formula $Pb_3(SbO_4)_2$ are well known ceramic pigments and are sufficiently stable for practical purposes at firing temperatures as high as Cone 06. (975° C. to 1015° C.) Such a pigment, however, is not stable when fired to higher temperatures, and glazes pigmented therewith fire out to a very pale yellow, almost white, when fired to a temperature as high as Cone 02. (1080° C. to 1125° C.)

We have now discovered that certain modified lead antimonate pigments possess a very much improved heat stability, and while losing some color, nevertheless result in very pleasing lemon yellows when fired in glaze at temperatures as high as Cone 02. The modified lead antimonate colors referred to are lead antimonate compositions containing small proportions of ceria and alumina. Lead and antimony oxides may be calcined together with oxides of cerium and aluminum in intimate admixture, in a temperature range from about 900° C. to about 1200° C. to form the novel pigments. The batch composition which we prefer to use comprises lead nitrate, antimony trioxide, cerium hydrate and aluminum hydrate. The pigments are formed under oxidizing conditions and it is believed that the state of oxidation of the various metals in the final product is as if the product were a mixture of $PbO$, $Sb_2O_5$, $Al_2O_3$ and $CeO_2$. We believe that the state of association of these constituent oxides is more intimate than a mere mixture and that they are either chemically or physically combined either as complex compounds or solid solutions. Other compounds may be used in the batch compositions, such as upon heating alone in the temperature range at which the pigment is formed, under oxidizing conditions will yield either by oxidation or thermal decomposition or both, the indicated oxides but will not yield non-volatile contaminants not easily removed. Some non-volatile by-products act as mere diluents and can be tolerated to some extent. We may, for example, make use not only of lead nitrate but lead hydroxide, lead carbonate or any of the various lead oxides. Antimony may be used in the form of $Sb_2O_5$, $Sb_2O_4$, $Sb_2O_3$. Cerium is most conveniently used in the form of $CeO_2$ or $Ce(OH)_4$, while alumina is most conveniently used in the form of $AlOH_3$ or $Al_2O_3$. Lead antimonate itself may be used as a batch ingredient although the batches set forth below in the specific examples are those which we have found to be most convenient and highly satisfactory.

The batch must be heated in advance of its use for coloring a glaze or enamel to react the essential oxides making up the color. Calcination for this purpose may be in the range from 900° C. to 1200° C., preferably 1050° C. to 1150° C. for from 1 to 3 hrs. The firing time is not sharply critical and should be longer for lower temperatures and shorter for higher temperatures. A very satisfactory firing cycle is to bring the temperature up to a peak of 1100° C. to 1200° C. in from 3 to 6 hours and then cool the batch down to room temperature in a similar period of time.

We have found that if we omit either alumina or ceria, we do not obtain the increased heat stability. Both these modifying compounds are essential. Proportions may be varied over a wide range, good results being obtained when $CeO_2$ amounts to from about 1% to about 15%, and alumina amounts to from about 1.5% to about 15%. Optimum results are had when $CeO_2$ is in the range from about 1.5% to about 7.5% and alumina is in the range from about 5% to about 10%, percentages being based on the combined weight of the oxides of lead, antimony, cerium, and aluminum. Stated in another way, it may be said that the pigments contemplated by the invention are fired composite pigments of the lead antimonate type containing the oxides of lead, antimony, cerium, and aluminum in proportions of about 50 to 70 parts $PbO$, about 20 to about 45 parts $Sb_2O_5$, about 1 to 15 parts $CeO_2$ and about 1.5 to 15 parts $Al_2O_3$, parts being by weight based upon the combined weights of $PbO$, $Sb_2O_5$, $CeO_2$, and $Al_2O_3$. The invention contemplates also the addition to the above compositions of from 1 to 10 parts by weight of $Fe_2O_3$ based upon the combined weight of $PbO$, $Sb_2O_5$, $CeO_2$ and $Al_2O_3$. Optimum proportions are from about 50 to 60 parts $PbO$, 30 to 40 parts $Sb_2O_5$, 1.5 to 7.5 parts $CeO_2$, and 5 to 10 parts $Al_2O_3$, parts being by weight based upon the combined weight of the four oxides. If iron is to be added, the optimum proportions are about 2 to 6 parts by weight based upon the combined weight of $PbO$, $Sb_2O_5$, $CeO_2$ and $Al_2O_3$. This description of the pigments assumes the intimate state of association resulting from firing to an extent to complete the reaction or solution or association of the component oxides as the case may be.

In the accompanying drawings, Fig. 1 is a diagrammatic, qualitative showing of the effects of varying the proportions of ceria and alumina, the proportions of lead and antimony oxides remaining constant in the proportions corresponding to $Pb_3(SbO_4)_2$; Fig. 2 is a similar schematic showing indicating the effect of varying the proportions of lead and antimony oxides, the proportions of ceria and alumina being maintained constant at the optimum value; Fig. 3 is a similar schematic showing of the effect of adding small quantities of $Fe_2O_3$ to the optimum four component composition; Fig. 4 is a graphic representation of the effect on the colors of a composition according to the invention and a similar color omitting cerium, of firing such colors in a glaze at Cone 06 and Cone 02; Fig. 5 is a graphic representation of the colors of the compositions represented in Fig. 2; Fig. 6 is a graphic representation of the colors of two of the compositions represented in Fig. 3, the others being omitted for clarity and Fig. 7 is a graphic representation of the colors of illustrative compositions represented in Fig. 1. In all the figures except as indicated, the color curves were taken from tiles fired at Cone 02.

In order to establish optimum composition proportions, numerous compositions were made up and fired in the same glaze on tiles at Cone 02. The resulting tiles were arranged in the manner indicated in Fig. 1, wherein each square may be considered as representing a tile and the composition of the color utilized in making that tile being represented by the location of the tile as indicated by the figures at the top and left. The tiles were arranged in columns and tiers, the number of parts by weight of $CeO_2$ being shown at the top of each column and the number of parts by weight of $Al_2O_3$ being shown at the left of each tier. The squares which are left blank represent proportions which were not made up. The tiles which are made are indicated by a combination of two letters which are taken as sample numbers and in each case a qualitative statement of the character of the resulting colored glaze is indicated, STR. indicating a strong lemon yellow color, MED. indicating a medium strong lemon yellow, while the other descriptive words require no explanation. The quantitative data which explains these qualitative descriptions is found in Fig. 7 which shows a series of lines approximating the spectrophotometer curves made from the tiles represented in Fig. 1. It will be seen that in Fig. 7 two representative color curves are used to indicate the majority of the tiles. This is not to be taken as indicating that all the color curves of the samples referred to these curves are exactly identical, but only that they are so similar that it would be confusing to try to put all of them on the drawing. It may be said that all those sample numbers connected by lead lines to each curve have colors very closely approximating the curve shown. The information shown in Figs. 1 and 7 illustrate graphically the statements made above in respect to the proportions of the four essential oxides in the finished products.

In Fig. 4 there is shown graphically a comparison between the optimum composition according to the invention and a similar composition omitting cerium when fired at Cone 06 and at Cone 02. The composition indicated by the reference character CF in Fig. 4 is the same composition as indicated by that reference character in the other figures of the drawing. The composition CA will be seen by reference to Fig. 1 to be of empirical composition: PbO, 61.6; $Sb_2O_5$, 29.7; $Al_2O_3$, 10; and no $CeO_2$, these figures being parts by weight. When these two compositions are made up as indicated above and fired in glaze on tile at Cone 06, they yield glazed tiles having color characteristics as indicated in the two curves at the right in Fig. 4. The curve marked CA(06) is a little more orange than the color marked CF(06). It may be said that at that firing temperature the CA composition is a little better than the CF composition although that might depend somewhat on the exact color desired. It is not likely that the color CF would be used for firing at Cone 06. When, however, the two compositions are made up and fired in glaze at Cone 02, the results seen in the two curves at the left in Fig. 4 appears. The curve marked CA(02) has fired out to a near white or very faint yellow. It might be called ivory but could hardly by any stretch of the imagination be called lemon. The curve marked CF(02) is seen to have moved from the more orange color of the lower fired glaze to a position which indicates a strong lemon yellow of very pleasing color. The composition marked CF(02) and CF(06) is the same composition as is indicated by the reference character CF elsewhere in the drawings.

While it was suspected that the proper proportions of PbO and $Sb_2O_5$ would be those corresponding to the formula $Pb_3(SbO_4)_2$ or $3PbO.Sb_2O_5$, a series of tiles was made for the purpose of ascertaining this point. In the sample composition CF the proportions of lead and antimony oxides were those corresponding to the above formula. Since this sample gave the best color, the ceria and alumina were left constant at 3.6 and 10 parts by weight respectively and the lead and antimony oxide proportions were changed. The theoretical proportions were 61.6 parts by weight PbO and 29.7 parts $Sb_2O_5$. Varying these proportions as indicated in Fig. 2 while the number of parts by weight of ceria and alumina remained constant, it was found that the theoretical proportions for $3PbO.Sb_2O_5$ were best. The results indicated, however, that some leeway is possible in the proportions of these oxides. Indeed, all the tiles represented in Fig. 2 might be considered acceptable with the possible exception of those indicated by reference characters CFF and CFG. The color characteristics of the tiles represented in Fig. 2 are seen in Fig. 5. The color curves for tiles CF and CFB were so similar that it was thought best to represent them both by the same curve.

A further feature of our invention is the addition of a small proportion of iron oxide which we find has the effect of rendering the color a little browner. While this effect is quantitatively small, it is quite noticeable. In Fig. 3 there is shown a series of compositions beginning with CF and adding the number of parts by weight of $Fe_2O_3$ indicated above each square. The composition including 4 parts by weight of $Fe_2O_3$ gives the strongest color. The arrows indicate the approach toward CFK from each direction. All the tiles represented in Fig. 3 are of acceptable quality. In Fig. 6 a comparison of the colors of compositions CF and CFK is shown. The other curves could not be shown on the same diagram without confusion. They all would lie approximately in the range which would be considered intermediate between CF and CFK.

The following specific examples will be illustrative:

*Example I*

A batch composition was made up consisting of 91.5 parts $Pb(NO_3)_2$, 26.8 parts $Sb_2O_3$, 15.3 parts $Al(OH)_3$ and 4 parts $Ce(OH)_4$. These ingredients were thoroughly mixed in finely divided state and placed in clay saggers containing approximately 6# each. These saggers were introduced into a tunnel kiln and brought up to 1100° C. over a period of 6 hours. The firing cycle was such that the temperature was maintained between 1100° C. and 1150° C. for a period of 2 hours. The batch then passed to cooler portions of the kiln and was brought down to room temperature in a period of 5 hours. Calculated proportions after calcination approximate $3PbO.Sb_2O_5.\frac{1}{4}CeO_2.Al_2O_3$. The resulting pigment was not fused but was a fluffy orange powder. This pigment was introduced into glaze and fired on tile at Cone 02. The result was the tile indicated by the reference character CF in Figs. 1 and 7. The firing temperature for the reaction of the ingredients to form the color is not sharply critical but it may be said that the peak temperature should not exceed 1200° C. lest substantial fusing of the pigment result. The peak temperature should not be lower than about 1000° C. since the reaction time slows down with lower temperatures. We recommend peak temperatures from 1050° C. to 1150° C. and a time within that range of from 1 to 3 hrs. The particular glaze composition is not sharply critical and any of the various commercially known glazes suitable for firing at Cone 02 may be used, for example we may use a glaze made up of 3.4 parts by weight Florida ball clay; 21.9 parts feldspar; 51.9 parts white lead; 5.0 parts $CaCO_3$; 4.1 parts ZnO and 13.7 parts $SiO_2$, parts being by weight in each case.

*Example II*

A composition was made up exactly the same as the composition of Example I with the exception that there were added 4 parts by weight $Fe_2O_3$. The resulting batch was made up and calcined in the same way as the batch of Example I and yielded the pigment indicated in the drawings by the reference character CFK. Calculated proportions approximate $3PbO.Sb_2O_5.\frac{1}{4}CeO_2.Al_2O_3.\frac{1}{4}Fe_2O_3$ When made up in tile, the color characteristics were as indicated in Figs. 2 and 6. The drawings indicate a series of compositions, all of which were made up and treated in substantially similar fashion to the composition of Example I and with the results indicated in the drawings.

The following table indicates a series of examples of batch compositions illustrative of the invention.

|              | I    | II   | III  | IV   | V    | VI   | VII  |
|--------------|------|------|------|------|------|------|------|
| PbO          |      |      | 61.6 |      |      |      |      |
| $Pb_3O_4$    |      |      |      |      | 63.0 |      |      |
| $PbO_2$      |      |      |      |      |      |      | 66.0 |
| $Pb(NO_3)_2$ | 91.5 | 91.5 |      |      |      |      |      |
| $2PbCO_3.Pb(OH)_2$ |      |      |      | 91.3 |      | 71.4 |      |
| $Pb_3(SbO_4)_2$ |   |      |      |      |      |      |      |
| $Sb_2O_3$    | 26.8 | 26.8 |      |      | 26.8 | 26.8 |      |
| $Sb_2O_4$    |      |      |      |      |      |      | 28.3 |
| $Sb_2O_5$    |      |      | 29.7 |      |      |      |      |
| $CeO_2$      |      |      | 3.6  | 3.6  |      |      | 3.6  |
| $Ce(OH)_4$   | 4.0  | 4.0  |      |      | 4.0  | 4.0  |      |
| $Al_2O_3$    |      |      | 10.0 | 10.0 |      |      | 10.0 |
| $Al(OH)_3$   | 15.3 | 15.3 |      |      | 15.3 | 15.3 |      |
| $Fe_2O_3$    |      | 4    |      |      |      |      |      |

These compositions were calcined 2 hours in the temperature range from 1050° C. to 1150° C. and yielded strong lemon yellow pigments of closely similar appearance as powder and in tile.

Having thus described our invention, what we claim is:

1. A fired, composite, yellow pigment comprising principally lead antimonate said lead antimonate being modified with minor proportions of cerium and aluminum oxides and having improved properties of heat stability as compared with unmodified lead antimonate, being the calcination product of oxides of lead, antimony, aluminum, and cerium and containing on the analytical basis cerium oxide to the extent of from 1% to 15% and aluminum oxide to the extent of from 1.5% to 15%, percentages by weight based upon the combined weights of lead, antimony, cerium and aluminum oxides.

2. A fired, composite, yellow pigment comprising principally lead antimonate said lead antimonate being modified with minor proportions of cerium and aluminum oxides and having improved properties of heat stability as compared with unmodified lead antimonate, being the calcination product of oxides of lead, antimony, aluminum, and cerium and containing on the analytical basis cerium oxide to the extent of 1.5% to 7.5% and aluminum oxide to the extent of from 5% to 10%, percentages by weight based upon the combined weights of lead, antimony, cerium and aluminum oxides.

3. A fired, composite, yellow pigment comprising principally lead antimonate said lead antimonate being modified with minor proportions of cerium and aluminum oxides and having improved properties of heat stability as compared with unmodified lead antimonate, being the calcination product of oxides of lead, antimony, aluminum, and cerium and containing on the analytical basis the oxides of lead, antimony, cerium and aluminum in proportions of about 50 to 70 parts PbO, about 20 to 45 parts $Sb_2O_5$, about 1 to 15 parts $CeO_2$ and about 1.5 to 15 parts $Al_2O_3$, parts being by weight based upon the combined weights of PbO, $Sb_2O_5$, $CeO_2$ and $Al_2O_3$.

4. A fired, composite, yellow pigment comprising principally lead antimonate said lead antimonate being modified with minor proportions of cerium and aluminum oxides and having improved properties of heat stability as compared with unmodified lead antimonate, being the calcination product of oxides of lead, antimony, aluminum, and cerium and containing on the analytical basis the oxides of lead, antimony, cerium and aluminum in proportions of about 50 to 60 parts PbO, about 30 to 40 parts $Sb_2O_5$, about 1.5 to 7.5 parts $CeO_2$ and about 5 to 10 parts $Al_2O_3$, parts being by weight based upon the combined weights of PbO, $Sb_2O_5$, $CeO_2$ and $Al_2O_3$.

5. A fired, composite, yellow pigment comprising principally lead antimonate said lead antimonate being modified with minor proportions of cerium and aluminum oxides and having improved properties of heat stability as compared with unmodified lead antimonate, being the calcination product of oxides of lead, antimony, aluminum, and cerium and containing on the analytical basis the oxides of lead, antimony, cerium and aluminum in proportions of about 50 to 70 parts PbO, about 20 to 45 parts $Sb_2O_5$, about 1 to 15 parts $CeO_2$ and about 1.5 to 15 parts $Al_2O_3$, parts being by weight based upon the combined weights of PbO, $Sb_2O_5$, $CeO_2$ and $Al_2O_3$, said pigment also containing from 1 to 10 parts by weight of $Fe_2O_3$ based upon the combined weights of PbO, $Sb_2O_5$, $CeO_2$ and $Al_2O_3$.

6. A fired, composite, yellow pigment comprising principally lead antimonate said lead antimonate being modified with minor proportions of cerium and aluminum oxides and having improved properties of heat stability as compared with unmodified lead antimonate, being the calcination product of oxides of lead, antimony, aluminum, and cerium and containing on the analytical basis the oxides of lead, antimony, cerium and aluminum in proportions of about 50 to 60 parts PbO, about 30 to 40 parts $Sb_2O_5$, about 1.5 to 7.5 parts $CeO_2$ and about 5 to 10 parts $Al_2O_3$, parts being by weight based upon the combined weight of PbO, $Sb_2O_5$, $CeO_2$ and $Al_2O_3$, said pigment also containing from 2 to 6 parts by weight of $Fe_2O_3$ based upon the combined weights of PbO, $Sb_2O_5$, $CeO_2$ and $Al_2O_3$.

7. A fired, composite, yellow pigment comprising principally lead antimonate said lead antimonate being modified with minor proportions of cerium and aluminum oxides, the same having improved properties of heat stability as compared with unmodified lead antimonate, being the calcination product of oxides of lead, antimony, aluminum, and cerium and having an empirical composition corresponding approximately to the formula:

$$3PbO \cdot Sb_2O_5 \cdot \tfrac{1}{4}CeO_2 \cdot Al_2O_3$$

8. A fired, composite, yellow pigment comprising principally lead antimonate said lead antimonate being modified with minor proportions of cerium and aluminum oxides, the same having improved properties of heat stability as compared with unmodified lead antimonate, being the calcination product of oxides of lead, antimony, aluminum, and cerium and having an empirical composition corresponding approximately to the formula:

$$3PbO \cdot Sb_2O_5 \cdot \tfrac{1}{4}CeO_2 \cdot Al_2O_3 \cdot \tfrac{1}{4}Fe_2O_3$$

9. A process for producing a fired, composite, yellow pigment comprising lead antimonate modified with cerium and aluminum oxides including the steps of firing under oxidizing conditions in the temperature range from 900° C. to 1200° C. oxy-compounds of lead and antimony capable of forming lead antimonate in that temperature range together with from 1½% to 15% aluminum oxide and from 1% to 15% of cerium oxide, percentages by weight based upon the combined weights of lead, antimony, cerium and aluminum oxides.

10. The invention as defined in claim 9 further characterized in that the lead and antimony compounds are present in proportion from 50 to 70 parts lead compound calculated as PbO to 20 to 45 parts antimony compound calculated as $Sb_2O_5$.

11. A process for producing a fired, composite, yellow pigment comprising lead antimonate modified with cerium and aluminum oxides including the steps of firing under oxidizing conditions in the temperature range from 900° C. to 1200° C. oxy-compounds of lead and antimony capable of forming lead antimonate in that temperature range together with from 5% to 10% aluminum oxide and from 1½% to 7½% of cerium oxide, percentages by weight based upon the combined weights of lead, antimony, cerium and aluminum oxides.

BURNHAM W. KING, Jr.
ADOLPH O. TESAR.

No references cited.